(12) United States Patent
Charron

(10) Patent No.: US 9,347,328 B2
(45) Date of Patent: May 24, 2016

(54) COMPRESSED AIR PLENUM FOR A GAS TURBINE ENGINE

(75) Inventor: Richard Charron, West Palm Beach, FL (US)

(73) Assignee: SIEMENS ENERGY, INC., Orlando, FL (US)

(*) Notice: Subject to any disclaimer, the term of this patent is extended or adjusted under 35 U.S.C. 154(b) by 1118 days.

(21) Appl. No.: 12/852,707

(22) Filed: Aug. 9, 2010

(65) Prior Publication Data

US 2012/0031068 A1 Feb. 9, 2012

(51) Int. Cl.
*F02C 7/00* (2006.01)
*F01D 9/02* (2006.01)

(52) U.S. Cl.
CPC . *F01D 9/023* (2013.01); *F02C 7/00* (2013.01); *F05D 2260/96* (2013.01)

(58) Field of Classification Search
CPC .............. F23R 3/04; F23R 3/46; F01D 9/023; F01D 29/441; F01D 29/541
USPC ................. 60/39.37, 804, 751, 752–760; 415/211.2
See application file for complete search history.

(56) References Cited

U.S. PATENT DOCUMENTS

| | | | | |
|---|---|---|---|---|
| 3,169,367 A * | 2/1965 | Hussey | .................. | 60/39.37 |
| 3,333,762 A * | 8/1967 | Vrana | .................. | 415/207 |
| 4,100,732 A * | 7/1978 | Bryans et al. | .................. | 60/804 |
| 4,129,985 A * | 12/1978 | Kajita et al. | .................. | 60/39.37 |
| 5,592,820 A * | 1/1997 | Alary et al. | .................. | 60/751 |
| 5,927,066 A * | 7/1999 | Shekleton et al. | .................. | 60/804 |
| 6,279,322 B1 * | 8/2001 | Moussa | .................. | 60/751 |
| 6,564,555 B2 * | 5/2003 | Rice et al. | .................. | 60/746 |
| 6,860,098 B2 * | 3/2005 | Suenaga et al. | .................. | 60/39.23 |
| 7,225,624 B2 * | 6/2007 | Ress, Jr. | .................. | 60/782 |
| 7,624,577 B2 * | 12/2009 | Patel et al. | .................. | 60/752 |
| 7,870,739 B2 * | 1/2011 | Bland | .................. | 60/760 |
| 2008/0256926 A1 * | 10/2008 | Ziaei et al. | .................. | 60/269 |

* cited by examiner

*Primary Examiner* — Steven Sutherland

(57) ABSTRACT

A compressed air supply system for routing compressed air from a compressor to at least one combustor of a gas turbine engine is disclosed. The compressed air supply system may be formed from one or more plenums having an upstream end in fluid communication with an inner chamber of the compressor in which air is compressed and having a downstream end in fluid communication with the at least one combustor. Channeling compressed air through the plenum reduces damage to other components by confining the compressed air within the plenum. An upstream end of the plenum may be sealed to at least a portion of the compressor, and a downstream end of the plenum may be sealed to at least a portion of one or more combustors.

11 Claims, 4 Drawing Sheets

US 9,347,328 B2

COMPRESSED AIR PLENUM FOR A GAS TURBINE ENGINE

FIELD OF THE INVENTION

This invention is directed generally to gas turbine engines, and more particularly to components useful for routing compressed air from compressors to a combustors of gas turbine engines.

BACKGROUND OF THE INVENTION

Typically, gas turbine engines include a compressor for compressing air, a combustor for mixing the compressed air with fuel and igniting the mixture, and a turbine blade assembly for producing power. Compressed air is exhausted from an exhaust opening in the compressor into the shell of the turbine engine wherein the compressed air diffuses into a mid-frame cavity and undergoes turbulent flow around the hardware before finding the inlet to the combustor. In such a configuration, all of the components forming the turbine engine that are contained within the shell are exposed to pressurized, hot air. However, the compressor exit temperature is often too high for the steel casing material.

SUMMARY OF THE INVENTION

This invention is directed to a compressed air supply system for routing compressed air from a compressor to at least one combustor of a gas turbine engine. The compressed air supply system may be formed from one or more plenums having an upstream end in fluid communication with an inner chamber of the compressor in which air is compressed and having a downstream end in fluid communication with the at least one combustor. Channeling compressed air through the plenum reduces damage to other components of the turbine engine by confining the compressed air within the plenum. The upstream end of the plenum may be sealed to at least a portion of the compressor, and the downstream end of the plenum may be sealed to at least a portion of one or more combustors such that the pressure of the compressed air within the plenum may be controlled separately from other air within the shell of the turbine engine.

The plenum may have an upstream end in fluid communication with an inner chamber of the compressor in which air is compressed and having a downstream end in fluid communication with the at least one combustor. The upstream end of the plenum may be sealed to at least a portion of the compressor, and a downstream end of the plenum may be sealed to at least a portion of the at least one combustor. In one embodiment, the compressed air supply system may include a plurality of plenums extending from the compressor to the combustor. The plurality of plenums may be meshed together such that mouths at the upstream end of the plenums form a continuous ring radially outward from compressor blades.

An upstream end of the at least one plenum may have a mouth configured to be attached to a radially outer wall positioned radially outward from compressor blades. The mouth may have an opening configured to be positioned generally tangential to a flow path of an outermost point on a compressor blade. The plenum may extend from the mouth in a curved manner such that a longitudinal axis at the mouth is generally orthogonal to a line tangential to the flow path of an outermost point on a compressor blade, and the longitudinal axis proximate to a midpoint of the plenum is generally aligned with the line tangential to the flow path of an outermost point on a compressor blade. In an alternative embodiment, the plenum may extend downstream from the mouth generally tangential to a flow path of an outermost point on a compressor blade and extends axially, wherein the plenum curves radially outward such that the plenum extends generally radially outward.

A downstream end of the plenum may have a curved exhaust opening. The downstream end of the plenum may have a generally cylindrical exhaust opening that functions as a flow conditioner. The generally cylindrical exhaust opening may be positioned in the plenum such that the plenum surrounds the cylindrical exhaust opening. The plenum may be formed from one or more walls forming a completely contained plenum with only an inlet mouth and an exhaust opening.

An advantage of this invention is that the plenum directs hot compressed air into the combustors without exposing other aspects of the turbine engine to the hot air.

Another advantage of this invention is that the compressed air exits the compressor tangential to the flow path of the compressor blades and flows into the plenum toward the combustor.

Yet another advantage of this invention is that the plenum controls the rate of diffusion of the compressed air in the plenum.

Another advantage of this invention is that exhaust opening in the plenum functions as a flow conditioner to control the flow into the combustor.

Still another advantage of this invention is that an axial distance between the compressor exit and the turbine inlet can be decreased through use of the plenum.

These and other embodiments are described in more detail below.

BRIEF DESCRIPTION OF THE DRAWINGS

The accompanying drawings, which are incorporated in and form a part of the specification, illustrate embodiments of the presently disclosed invention and, together with the description, disclose the principles of the invention.

DETAILED DESCRIPTION OF EMBODIMENTS OF THE INVENTION

Figure 1:
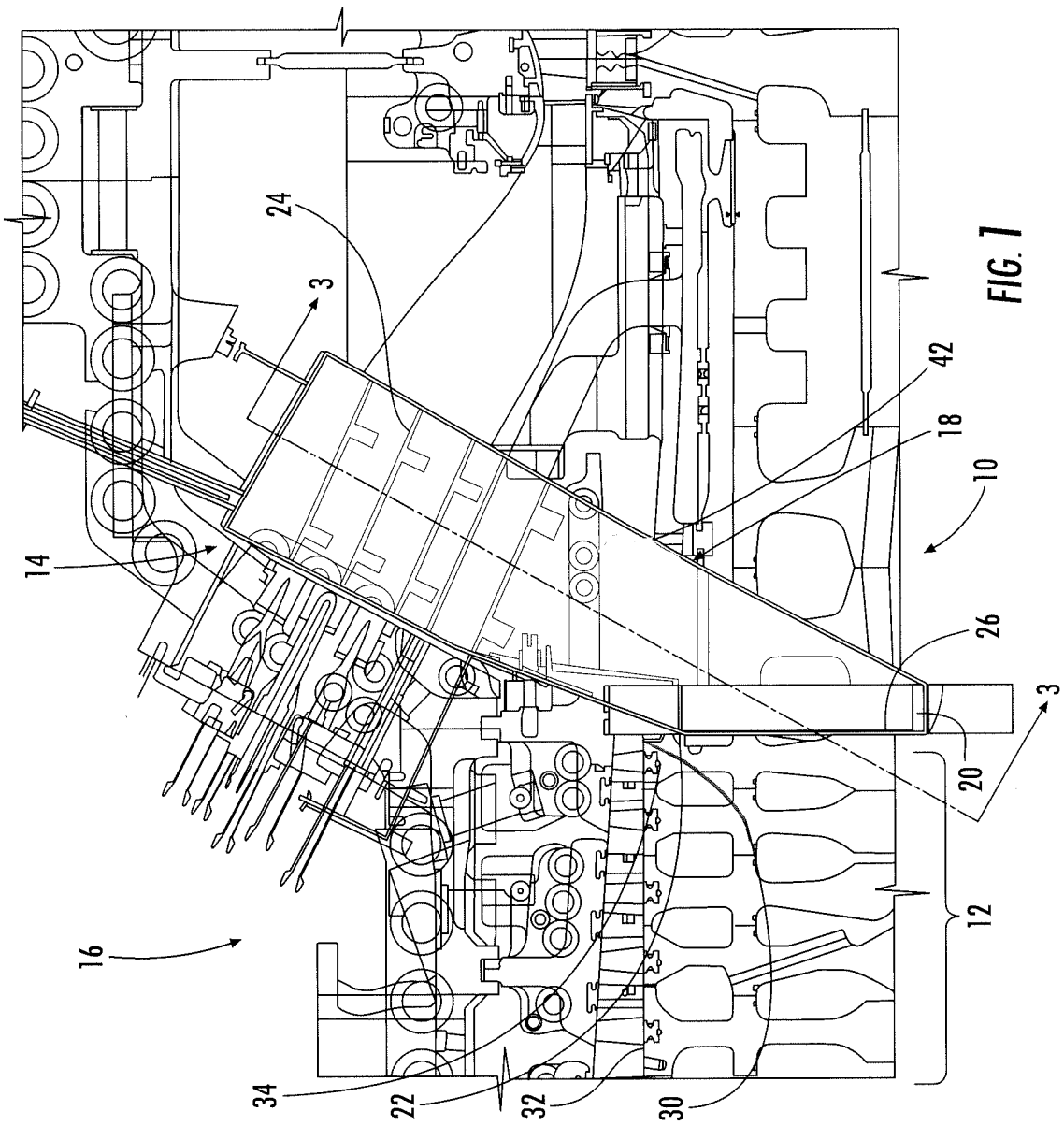
FIG. 1 is a partial cross-sectional view of a portion of a gas turbine engine including a compressed air supply system.

As shown in FIGS. 1-5, this invention is directed to a compressed air supply system 10 for routing compressed air from a compressor 12 to at least one combustor 14 of a gas turbine engine 16. The compressed air supply system 10 may be formed from one or more plenums 18 having an upstream end 20 in fluid communication with an inner chamber 22 of the compressor 12 in which air is compressed and having a downstream end 24 in fluid communication with the at least one combustor 14. Channeling compressed air through the plenum 18 reduces damage to other components of the turbine engine 16 by confining the compressed air within the plenum 18. The upstream end of the plenum 18 may be sealed to at least a portion of the compressor 12, and the downstream end 24 of the plenum 18 may be sealed to at least a portion of one or more combustors 14 such that the pressure of the compressed air within the plenum 18 may be controlled separately from other air within the shell of the turbine engine 16.

The compressed air supply system 10 includes one or more plenums 18 extending between the compressor 12 and one or more combustors 14. The plenum 18 may have any appropriate configuration to direct compressed air from the compressor 12 to one or more combustors 14. The combustors 14 may be, but are not limited to being, can annular combustors. The plenum 18 may be sealed to the compressor 12 or sealed to a component that is itself attached to or at least in fluid communication with the compressor 12. By sealing the plenum 18 to the compressor 12 and the combustor 14, the high temperature compressed air is contained and kept separate from the low temperature and low pressure air contained within the shell of the turbine engine 16. The plenum 18 may be formed from one or more walls 42 forming a completely contained plenum 18 with only an inlet mouth 28 and an exhaust opening 40. Other aspects of the plenum 18 may be completely sealed to contain the compressed air. The plenum 18 may be formed from any appropriate material capable of withstanding the pressure of the compressed air, heat and other environmental factors.

Figure 4:
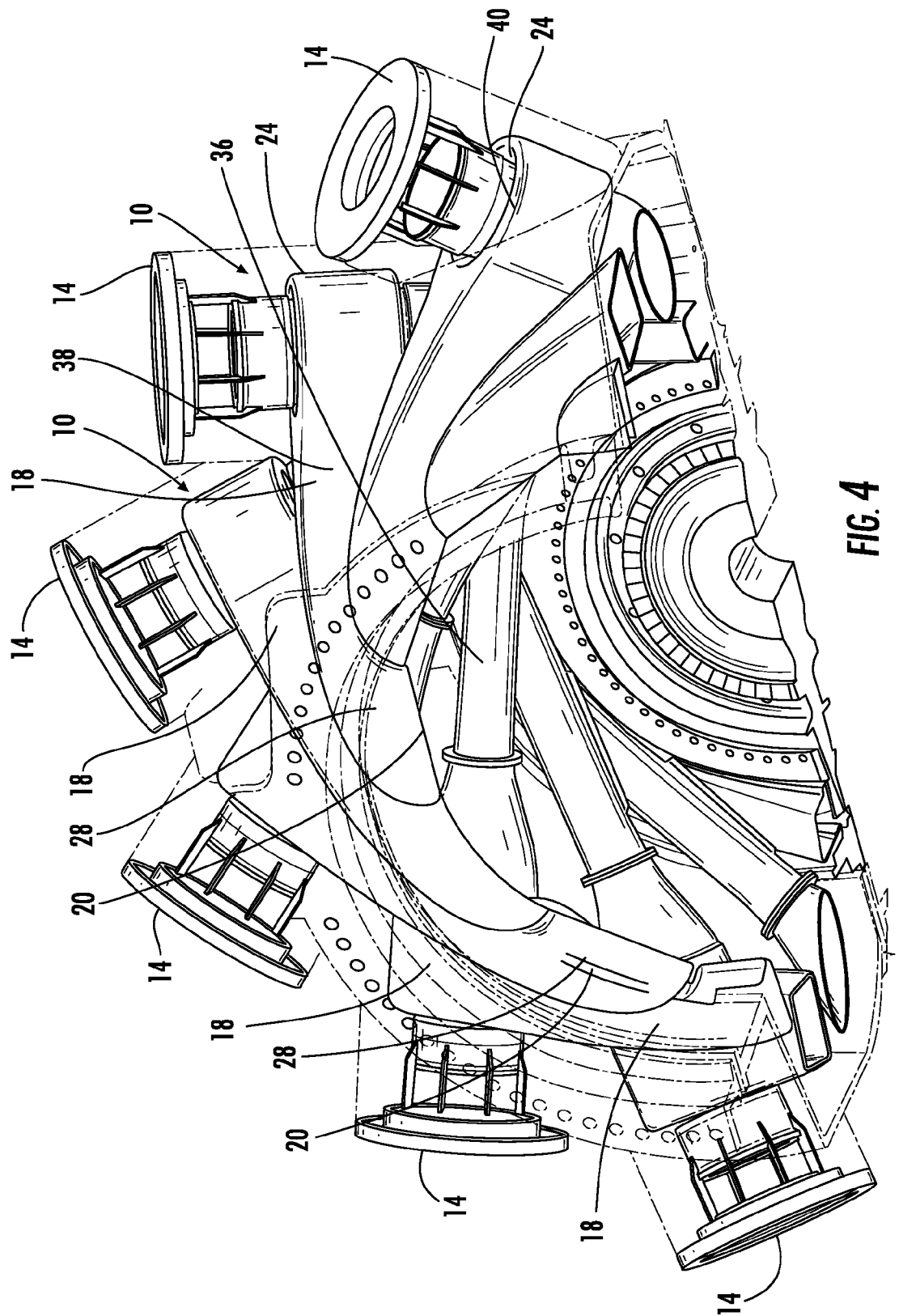
FIG. 4 is partial perspective view of plenums forming the compressed air supply system.
Figure 5:
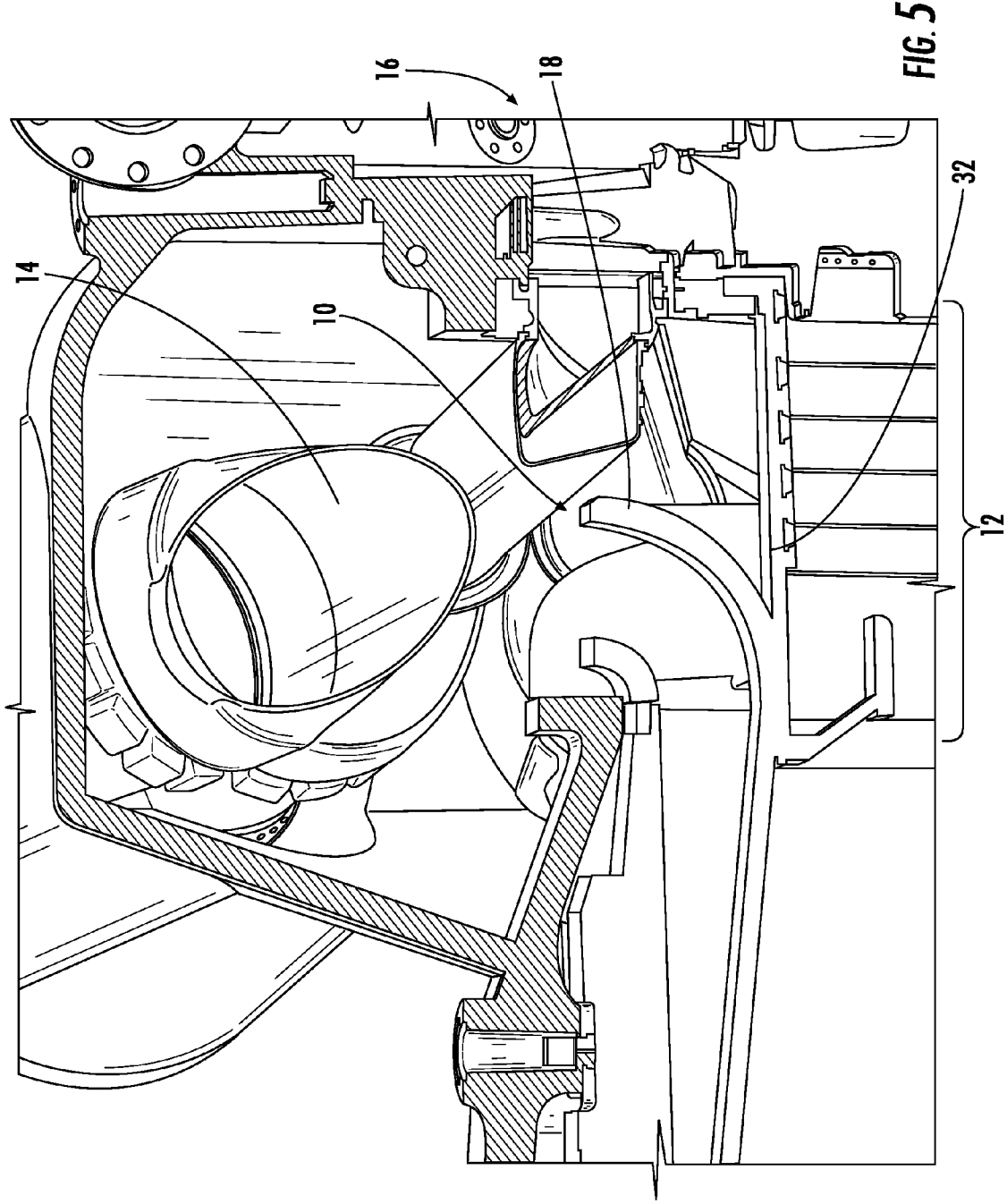
FIG. 5 is a partial cross-sectional view of an alternative embodiment of a portion of the plenum of the compressed air supply system attached to a compressor.

The plenum 18 may be positioned in any appropriate location on the compressor 12. In at least one embodiment, the upstream end 20 of the plenum 18 may be positioned at the downstream end 26 of the compressor 12, as shown in FIGS. 1 and 4. In another embodiment, as shown in FIG. 5, the upstream end 20 of the plenum 18 may be positioned upstream from the downstream end 26 of the compressor 12. In particular, the upstream end 20 of the plenum 18 may be positioned generally in a midstage region.

Figure 2:
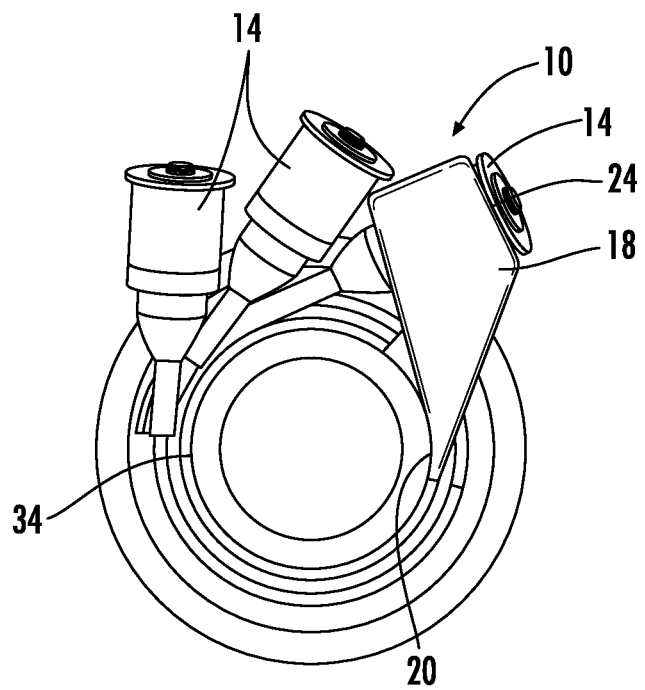
FIG. 2 is a partial axial view of the compressed air supply system and a plurality of can annular combustors.
Figure 3:
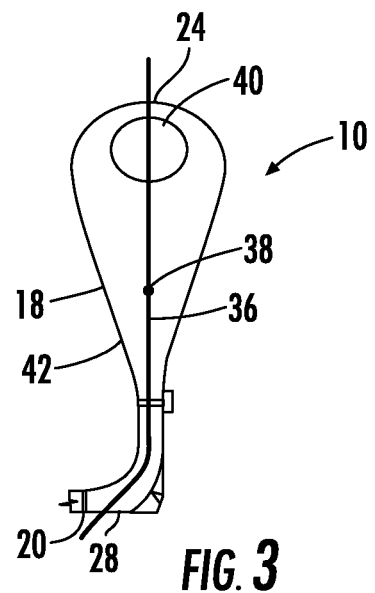
FIG. 3 is a cross-sectional view of a plenum of the compressed air supply system taken along section line 3-3 in FIG. 1.

As shown in FIGS. 1-3, the upstream end 20 of the plenum 18 may be sealed to at least a portion of the compressor 12, and the downstream end 24 of the plenum 18 may be sealed to at least a portion of one or more combustors 14. In at least one embodiment, the compressed air supply system 10 may include a plurality of plenums 18, as shown in FIG. 4, extending from the compressor 12 to one or more combustors 14. The plurality of plenums 18 may include a plurality of plenums 18 meshed together such that mouths 28 at the upstream end 20 of the plenums 18 forms a continuous ring radially outward from a stage of compressor blades 30. The mouth at the upstream end 20 of the plenum 18 may be configured to be attached to a radially outer wall 32 positioned radially outward from compressor blades 30.

In one embodiment, as shown in FIG. 4, the mouth 28 may have an opening configured to be positioned generally tangential to a flow path 34 of an outermost point on a compressor blade 30. The plenum 18 may extend from the mouth 28 in a curved manner such that a longitudinal axis 36 at the mouth 28 is generally orthogonal to a line 34 tangential to the flow path of an outermost point on a compressor blade 30. The longitudinal axis 36 proximate to a midpoint 38 of the plenum 18 may be generally aligned with the line 34 tangential to the flow path of an outermost point on a compressor blade 30. Thus, the flow path of compressed air in the plenum 18 may curve about 90 degrees from the mouth 28 to the midpoint 38 to direct compressed air to the combustors 14.

In another embodiment the plenum 18 may extend downstream from the mouth 28 generally tangential to a flow path 34 of an outermost point on a compressor blade 30 and may extend axially. The plenum 18, as shown in FIG. 5, may curve radially outward such that the plenum 18 extends generally radially outward to the combustors 14. The radially outward curved plenum 18 of FIGS. 3 and 5 may be used in the midstage region as shown or in other appropriate locations.

The plenum 18 may be configured such that the downstream end 24 of the plenum 18 has a curved exhaust opening 40, as shown in FIGS. 3 and 4, that may function as a flow conditioner for the compressed air flowing into the combustor 14. As shown in FIGS. 3 and 4, a downstream end 24 of the plenum 18 may have a generally cylindrical exhaust opening 40. The generally cylindrical exhaust opening 40 may be positioned in the plenum 18 such that the plenum 18 surrounds the cylindrical exhaust opening 40. The generally cylindrical exhaust opening 40 may be configured to exhaust cooling fluids into all sides of the combustor 14 or more efficient operation. Such configuration of the downstream end 24 enables the plenum 18 to be used without compressor exit guide vanes.

During operation of the turbine engine 16, the compressor blades 30 rotate within the compressor 12, thereby compressing the air and increasing the temperature of the air within the compressor 12. The compressed air may be directed into one or more plenums 18. The compressed air may leave the compressor 12 with a tangential component such that the compressed air may be supplied from the radial compressor last stage at the downstream end 26. The compressed air may be radially diffused upon entering the plenums 18 such that the compressed air is provided at an optimum velocity to the combustor 14. The compressed air flows to the exhaust opening 40 where the flow conditioner exhaust opening 40 enables the compressed air to be supplied to the combustor 14 in a uniform manner. The compressed air flows into the combustor 14 and is mixed. The compressed air may be at a higher pressure and temperature than the air contained within the shell of the turbine engine 16 but outside of the plenum 18.

The foregoing is provided for purposes of illustrating, explaining, and describing embodiments of this invention. Modifications and adaptations to these embodiments will be apparent to those skilled in the art and may be made without departing from the scope or spirit of this invention.

I claim:

1. A compressed air supply system for routing compressed air from a compressor to at least one combustor of a gas turbine engine, comprising:
 a plurality of plenums, each plenum having an upstream end in fluid communication with an inner chamber of the compressor in which air is compressed and having a downstream end in fluid communication with the at least one combustor;
 wherein the plurality of plenums comprises a plurality of plenums meshed together such that mouths at the upstream end of the plenums form a continuous ring radially outward from compressor blades;
 wherein each of the plenums extend downstream from the mouth generally tangential to a flow path of an outermost point on a compressor blade and extends axially, wherein the plenum curves radially outward such that the plenum extends generally radially outward; and
 a flow conditioner at a downstream end of the at least one plenum that is formed from a cylindrical exhaust opening surrounded by the at least one plenum that is larger than a diameter of the cylindrical exhaust opening.

2. The compressed air supply system of claim 1, wherein an upstream end of at least one plenum is sealed to at least a portion of the compressor, and a downstream end of at least one plenum is sealed to at least a portion of the at least one combustor.

3. The compressed air supply system of claim 1, wherein the mouth of each plenum is configured to be attached to a radially outer wall positioned radially outward from compressor blades.

4. The compressed air supply system of claim 3, wherein the mouth of each plenum has an opening configured to be positioned generally tangential to a flow path of an outermost point on a compressor blade.

5. The compressed air supply system of claim 3, wherein each plenum extends from the mouth in a curved manner such that a longitudinal axis at the mouth is generally orthogonal to a line tangential to the flow path of an outermost point on the compressor blade and the longitudinal axis proximate to a midpoint of the plenum is generally aligned with the line tangential to the flow path of an outermost point on the compressor blade.

6. The compressed air supply system of claim 1, wherein the generally cylindrical exhaust opening is positioned in each plenum such that each plenum surrounds the cylindrical exhaust opening.

7. The compressed air supply system of claim 1, wherein each plenum is formed from at least one wall forming a completely contained plenum with only an inlet mouth and an exhaust opening.

8. A compressed air supply system for routing compressed air from a compressor to at least one combustor of a gas turbine engine, comprising:
   a plurality of plenums, each plenum having an upstream end in fluid communication with an inner chamber of the compressor in which air is compressed and having a downstream end in fluid communication with the at least one combustor;
   wherein the plurality of plenums comprises a plurality of plenums meshed together such that mouths at the upstream end of the plenums form a continuous ring radially outward from compressor blades;
   wherein each of the plenums extend downstream from the mouth generally tangential to a flow path of an outermost point on a compressor blade and extends axially, wherein the plenum curves radially outward such that the plenum extends generally radially outward; and
   a flow conditioner at a downstream end of the at least one plenum that is formed from a curved exhaust opening;
   wherein an upstream end of each plenum is sealed to at least a portion of the compressor, and a downstream end of each plenum is sealed to at least a portion of the at least one combustor;
   wherein a generally cylindrical exhaust opening is positioned in each plenum such that the cylindrical exhaust opening is surrounded by the at least one plenum that is larger than a diameter of the cylindrical exhaust opening.

9. The compressed air supply system of claim 8, wherein the mouth has an opening configured to be positioned generally tangential to a flow path of an outermost point on the compressor blade.

10. The compressed air supply system of claim 8, wherein each plenum extends from the mouth in a curved manner such that a longitudinal axis at the mouth is generally orthogonal to a line tangential to the flow path of an outermost point on the compressor blade and the longitudinal axis proximate to a midpoint of the plenum is generally aligned with the line tangential to the flow path of an outermost point on the compressor blade.

11. The compressed air supply system of claim 8, wherein each of the plenums is formed from at least one wall forming a completely contained plenum with only an inlet mouth and an exhaust opening.

\* \* \* \* \*